United States Patent [19]
Robinson et al.

[11] Patent Number: 6,091,463
[45] Date of Patent: Jul. 18, 2000

[54] DIFFRACTIVE SPATIAL LIGHT MODULATOR

[75] Inventors: Michael Geraint Robinson; Craig Tombling, both of Stadhampton; Nicholas Mayhew, Oxford, all of United Kingdom; Mitsuhiro Koden, Kashiwa, Japan; Michael John Towler, Botley, United Kingdom

[73] Assignee: Sharp Kabushiki Kaisha, Osaka, Japan

[21] Appl. No.: 09/014,666

[22] Filed: Jan. 28, 1998

[30] Foreign Application Priority Data

Jan. 31, 1997 [GB] United Kingdom .................. 9702076

[51] Int. Cl.[7] .......................... G02F 1/135; G02F 1/1343; G02F 1/13
[52] U.S. Cl. ............................. 349/25; 349/141; 349/201
[58] Field of Search ............................. 349/25, 141, 201

[56] References Cited

U.S. PATENT DOCUMENTS

| | | | |
|---|---|---|---|
| 4,259,600 | 3/1981 | Fellrath et al. | 307/270 |
| 4,585,311 | 4/1986 | Kawamura et al. | 350/347 |
| 4,850,681 | 7/1989 | Yamanobe et al. | 350/348 |
| 4,902,103 | 2/1990 | Miyake et al. | 350/336 |
| 5,013,141 | 5/1991 | Sakata | 350/348 |
| 5,073,010 | 12/1991 | Johnson et al. | 359/72 |
| 5,182,665 | 1/1993 | O'Callaghan et al. | 349/141 |
| 5,227,900 | 7/1993 | Inabe et al. | 359/56 |
| 5,260,699 | 11/1993 | Lister et al. | 345/97 |
| 5,416,621 | 5/1995 | Tanaka et al. | 349/25 |
| 5,436,742 | 7/1995 | Tanaka et al. | 349/25 |
| 5,552,916 | 9/1996 | O'callaghan et al. | 359/95 |

FOREIGN PATENT DOCUMENTS

| | | |
|---|---|---|
| 0632348 | 1/1995 | European Pat. Off. . |
| 0811872 | 12/1997 | European Pat. Off. . |
| 2069213 | 8/1981 | United Kingdom . |
| 2225122 | 5/1990 | United Kingdom . |
| 2269042 | 1/1994 | United Kingdom . |
| 2313920 | 10/1997 | United Kingdom . |

OTHER PUBLICATIONS

Jared et al.; "Electrically Addressed Spatial Light Modulator that Uses A Dynamic Memory"; vol. 16; No. 22; Nov. 15, 1991 pp. 1785–1787.

R.B. Apte et al., SID 93 Digest, pp. 807–808, 1993, "Deformable Grating Light Valves for High–Resolution Displays".

G. Sextro et al., SID 95 Digest, pp. 70–73, 1995, "Late--News Paper: High–Definition Projection System Using DMD Display Technology".

K. M. Johnson et al., IEEE Journal of Quantum Electronics, vol. 29, No. 2, "Smart Spatial Light Modulators Using Liquid Crystals on Silicon".

*Primary Examiner*—William L. Sikes
*Assistant Examiner*—Tarifor R. Chowdhury
*Attorney, Agent, or Firm*—Renner, Otto, Boisselle & Sklar

[57] ABSTRACT

A diffractive spatial light modulator includes: a layer of electro-optic material; a first electrode arrangement substantially covering a first side of the layer; and a second electrode arrangement substantially covering a second side of the layer. The first electrode arrangement includes a plurality of sets of elongate electrodes, and the elongate electrodes of each of the sets are electrically connected together and interdigitated with the elongate electrodes of at least one of the other acts. The second electrode arrangement includes a plurality of discrete picture element electrodes.

16 Claims, 7 Drawing Sheets

DIFFRACTIVE SPATIAL LIGHT MODULATOR

TECHNICAL FIELD OF THE INVENTION

The present invention relates to a diffractive spatial light modulator. Such a modulator may be used in a display.

BACKGROUND OF THE INVENTION

EP 0 811 872 and GB 2 313 920 disclose a diffractive spatial light modulator which may be used in a display. The spatial light modulator (SLM) comprises a ferroelectric liquid crystal layer covered on one side by a continuous electrode and on the other side by discrete picture element (pixel) electrodes. Each of the pixel electrodes comprises first and second sets of interdigitated electrodes. By applying suitable voltages to the various electrodes, each pixel can be switched between a non-diffractive state, in which light is transmitted or reflected into the zeroth order diffraction mode, and a diffractive state in which the pixel forms a phase-only diffraction grating and diffracts light into non-zero diffractive orders. In the diffractive mode, each pixel comprises a plurality of elongate or strip regions such that light beams passing through adjacent strip regions undergo a relative phase shift of 180 degrees. In the non-diffractive state, all light passing through the pixel is subject to substantially the same phase change. By collecting light in, for instance, the plus and/or minus first order diffraction modes for display, each pixel appears dark when in the non-diffractive state and light when in the diffractive state.

R. Apte et al, SID 1993, pp. 807–808, "Deformable Grating Light Valves for High Resolution Displays" disclose an arrangement which uses the same diffractive optical effect. However, diffraction is caused by mechanically moving freely suspended under-etched linear reflectors. G. Sextro et al, SID 1995, pp. 70–75, "High-Definition Projection System Using DMD Display Technology" discloses a high brightness projection panel which uses flexible micromirrors. The mirrors are controlled so as to deflect light in or out of the display light path.

K. M. Johnson et al, IEEE J. Quantum Electronics, 1993, vol. 29, No. 2, pp. 699–714, "Smart Spatial Light Modulators using Liquid Crystals on Silicon" discloses various techniques for combining liquid crystal devices with silicon integrated circuit technology to form SLMS.

SUMMARY OF THE INVENTION

According to the invention, there is provided a diffractive spatial light modulator characterised by comprising a layer of electro-optic material, a first electrode arrangement substantially covering a first side of the layer, and a second electrode arrangement substantially covering a second side of the layer, the first electrode arrangement comprising a plurality of sets of elongate electrodes, the elongate electrodes of each set being electrically connected together and being interdigitated with the elongate electrodes of the or each other set, the second electrode arrangement comprising a plurality of discrete picture element electrodes.

The electro-optic material may comprise a liquid crystal. The liquid crystal may be a ferroelectric liquid crystal.

The elongate electrodes may be transparent.

The picture element electrodes may be reflective.

The picture element electrodes may be arranged as a two dimensional array.

The picture element electrodes may be disposed on a substrate carrying addressing electronics. The addressing electronics may comprise active matrix addressing electronics. Each picture element may be connected to a respective control circuit comprising a storage element. Each storage element may comprise a capacitor connected to the input of a buffer. Each storage element may be connected to the respective picture element electrode by a gate having a control input, the control inputs of the gates being connected together.

The sets of elongate electrodes may be arranged to receive continuously applied voltages and each of the picture element electrodes may be selectively arranged to receive a first voltage, which is greater than or less than all of the continuously applied voltages, for selecting a non-diffractive picture element state, and at least one second voltage, which is between the highest and the lowest of the continuously applied voltages, for selecting a diffractive picture element state. The first voltage, the or each second voltage, and the continuously applied voltages may be inverted with respect to a predetermined voltage for alternate frames of data supplied to the modulator. The predetermined voltage may be zero.

The sets of electrodes and the picture element electrodes may be arranged to receive simultaneously first pulses and second pulses, respectively, each second pulse having an amplitude less than the amplitudes of the first pulses for switching to a diffractive picture element state or an amplitude between the highest and the lowest of the amplitudes of the first pulses for switching to a non-diffractive picture element state. The elongate electrodes and the picture element electrodes may be arranged to receive therebetween an alternating voltage which is present between consecutive first and second pulses.

It is thus possible to provide an SLM which is suitable for use as a high brightness display panel and which is convenient to manufacture. For instance, in the case of SLMs having two sets of interdigitated elongate electrodes, only two connections are required, for instance to a glass substrate carrying the elongate electrodes. Active matrix pixel addressing may be provided on another substrate which, in the case of reflective SLMs, may be formed using standard VLSI techniques. In active addressing arrangements, each frame of image data is written into and stored in what is effectively a frame memory within the addressing electronics while the preceding frame is being displayed. The frame refresh rate is not, therefore, dependent on the response speed of the electro-optic material. Thus, devices having large numbers of pixels can be used, for instance, for high definition television and three dimensional stereoscopic displays whilst maintaining other material properties such as switching angle.

It is further possible to avoid the presence of bipolar voltages on an "active" substrate so that the complexity of the substrate can be reduced to improve manufacturing yield. Even with planarisation, fabrication complexity is substantially reduced compared with that required if the active substrate had to include bipolar addressed electrodes.

For reflective devices, the efficiency of pixel modulation may be improved by providing a uniform reflector for each pixel. By avoiding interdigitated or "grating" electrodes on the active substrate, optical losses caused by light passing through gaps between reflecting electrode structures are manufacture.

BRIEF DESCRIPTION OF THE DRAWINGS

The invention will be further described, by way of example, with reference to the accompanying drawings, in which.

Like reference numerals refer to like parts throughout the drawings.

DETAILED DESCRIPTION OF THE INVENTION

Figure 1:
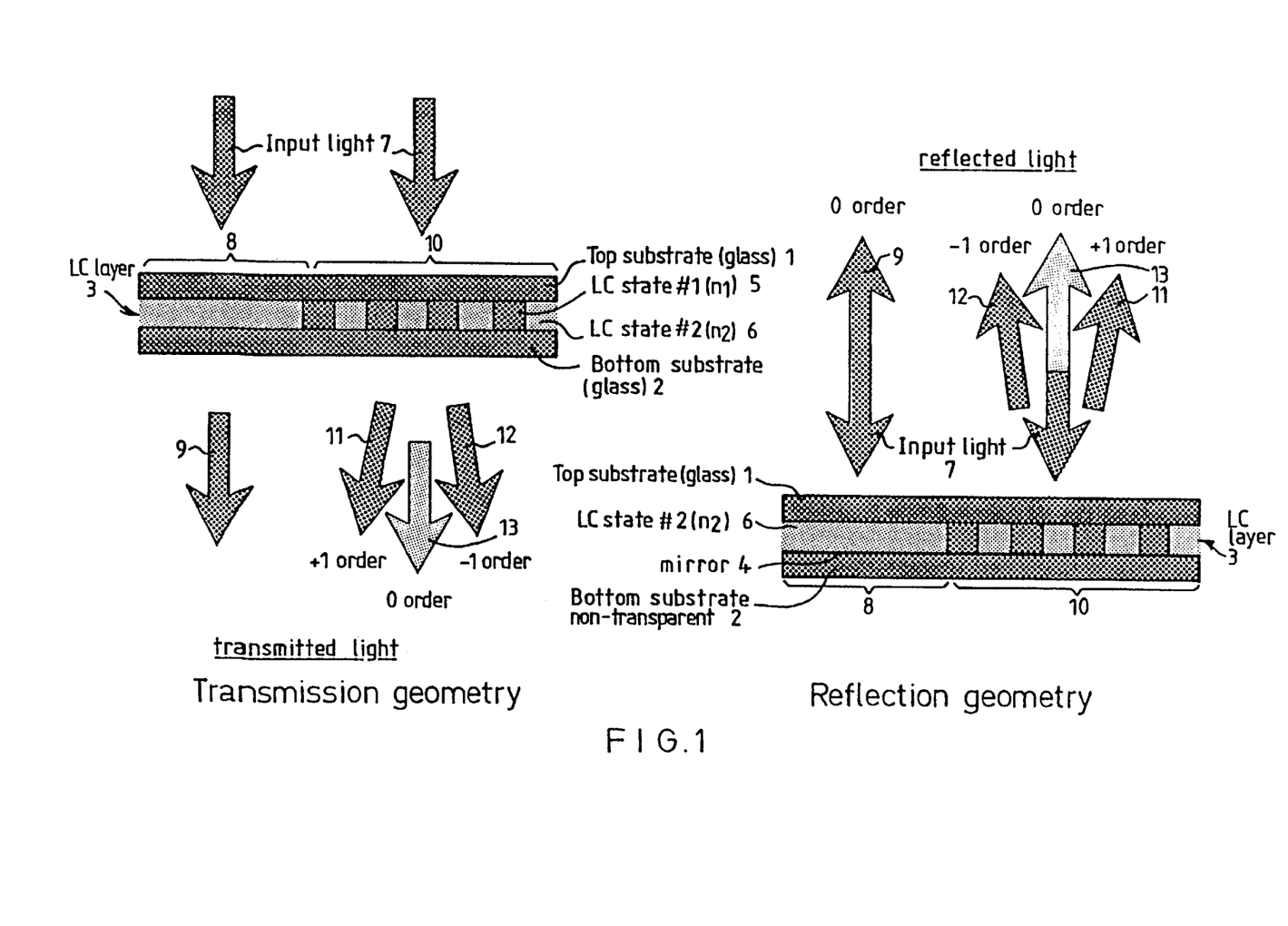
FIG. 1 is a diagram illustrating liquid crystal diffractive pixel modulation for transmissive and reflective modes of operation.

FIG. 1 illustrates the operation of a diffractive SLM for the cases of transmission and reflection geometry. The SLM is shown in simplified diagrammatic form and comprises a top substrate 1, for instance of glass, a bottom substrate 2, and a liquid crystal layer 3, for instance of ferroelectric liquid crystal (RLC). For the transmission geometry, the bottom substrate is transparent and may be made of glass. For the reflection geometry, the bottom substrate is non-transparent and a mirror 4 is disposed between the bottom substrate 2 and the liquid crystal layer 3. Portions of the liquid crystal of the layer 3 in a first state #1 and having a first refractive index n1 are indicated by shading at 5. Portions of the liquid crystal layer in a state #2 having a refractive index n2 are illustrated by lighter shading, for instance at 6.

For the transmission geometry, input light 7, which may be unpolarised, is incident on the top substrate 1 and passes through the liquid crystal layer 3. A region 8 of the device constitutes a pixel in which all of the liquid crystal of the layer 3 is in the second state. Light transmitted through this pixel is indicated by arrow 9 and is substantially unaffected. In particular, this pixel is in a non-diffractive state and light leaves the pixel in a direction corresponding to a zeroth order of diffraction. The region 10 corresponds to a pixel in the diffractive state. The liquid crystal comprises strips in the first state alternating with strips in the second state. The strips are arranged such that light rays passing through adjacent strips undergo a relative phase shift, for instance of 180 degrees. The pixel therefore acts as a phase-only diffraction grating and diffracts light into the higher diffraction orders. Arrow 11 indicates light diffracted into the positive first order whereas arrow 12 indicates light diffracted into the negative first order. Light leaving the pixel 10 in the zeroth order as indicated by arrow 13 is greatly attenuated.

Operation of the reflection geometry is substantially the same except that the light passing through the liquid crystal layer 3 is reflected back through the layer 3 by the mirror 4.

A diffractive SLM of the type whose operation is illustrated in FIG. 1 may be used as a display panel comprising a large number of pixels, for instance in the form of a regular two dimensional array. An example of such an SLM is disclosed in EP 0 811 872 and GB 2 313 920. Light diffracted into the positive and/or negative first diffraction orders is collected to form a displayed image, for instance by a suitable optical system (not illustrated). Thus, when a pixel is in the non-diffractive state, substantially no light is transmitted or reflected into the first diffraction orders and the pixel appears dark. When the pixel is in the diffractive state, the collected light is displayed so that the pixel appears bright. The display can be used with unpolarised input light 7 and is capable of providing a high brightness image of good contrast performance.

Figure 2:
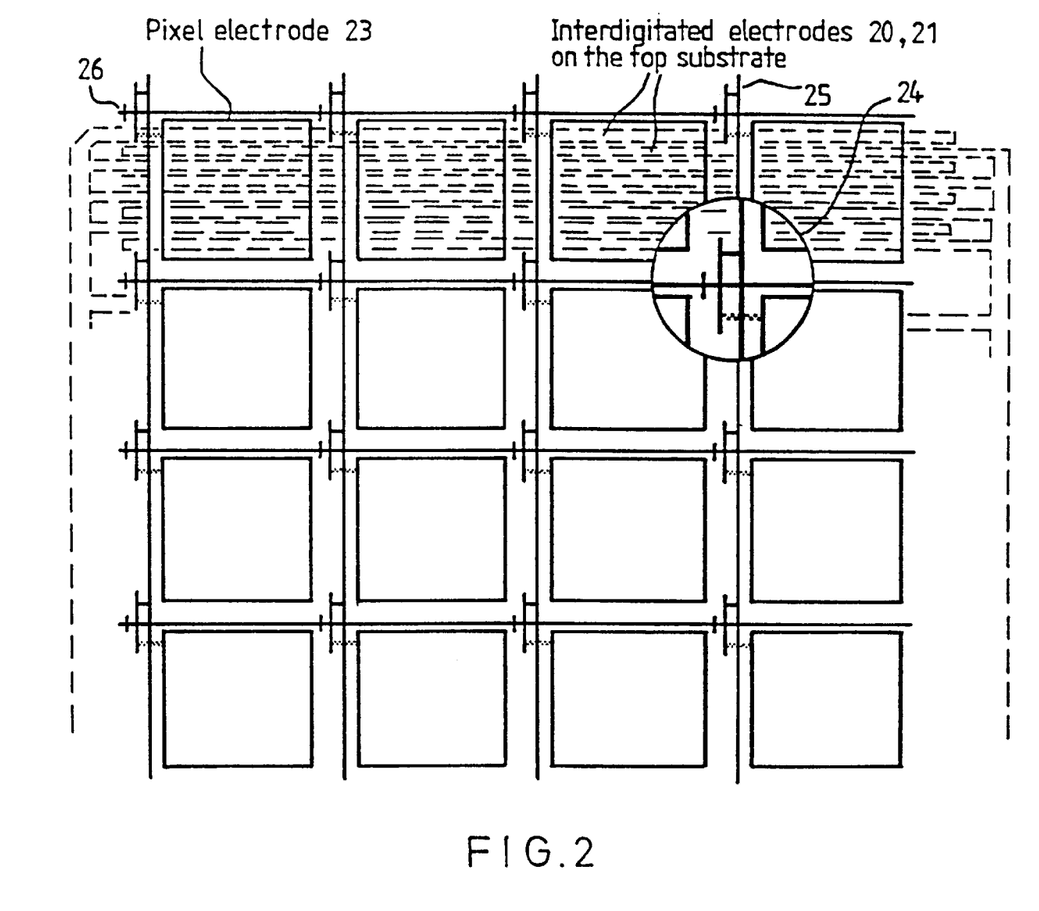
FIG. 2 is a schematic plan view of an SLM constituting an embodiment of the invention.

FIG. 2 illustrates the electrode structures of an SLM for use in a display in accordance with the operation illustrated in FIG. 1. The top substrate 1 carries two sets of interdigitated transparent electrodes 20 and 21, for instance made of indium tin oxide (ITO). The electrodes 20 and 21 are elongate or strip-shaped and are parallel with each other. The electrodes of each set are connected together and are interdigitated with the electrodes of the other set so that only two connections are required to the top substrate 1.

The bottom substrate 2 carries a rectangular array of pixel electrodes such as 23. As shown in FIG. 2, each pixel electrode 23 faces a plurality of the interdigitated transparent electrodes 20 and 21. A matrix addressing scheme is provided for individually controlling the pixel electrodes 23 and a pixel element of the addressing arrangement is shown diagrammatically to an enlarged scale at 24. In the arrangement illustrated, each pixel electrode 23 is connected to the source of a thin film transistor (TFT) in the form of a pixel field effect transistor (FET). The pixels are arranged as rows and columns with the drains of the transistors of each column being connected to a respective column or data electrode 25 and the gates of the transistors of each row being connected to a respective row or scan electrode 26. The pixels are thus enabled one row at a time so that image data for a complete row are written simultaneously. The addressing arrangement illustrated schematically in FIG. 2 is thus of the conventional dynamic random access memory (DRAM) type and may, for instance, be fabricated on a silicon bottom substrate 2 (in the case of a reflective display) or in the form of silicon on glass (for a transmissive display). The addressing arrangement may thus be substantially conventional and may be fabricated using substantially conventional techniques.

Switching between the diffractive and non-diffractive states of the pixels for FLC may be achieved by means of two different techniques. The first applied voltage, and hence electric field. Above a certain field valve, the FLC responds to field direction only and not to its magnitude.

The second technique relies on the dynamic threshold of the FLC and uses pulsed voltages and hence pulsed electric fields. In this case, the FLC switching speed is non-linearly dependent on the applied field. This technique also relies on the bistabilty of the FLC. Regions of the material subjected to a relatively low field do not respond whereas regions which are subjected to a higher field are fully switched and remain in the switched state until subsequently reset.

Figure 3:
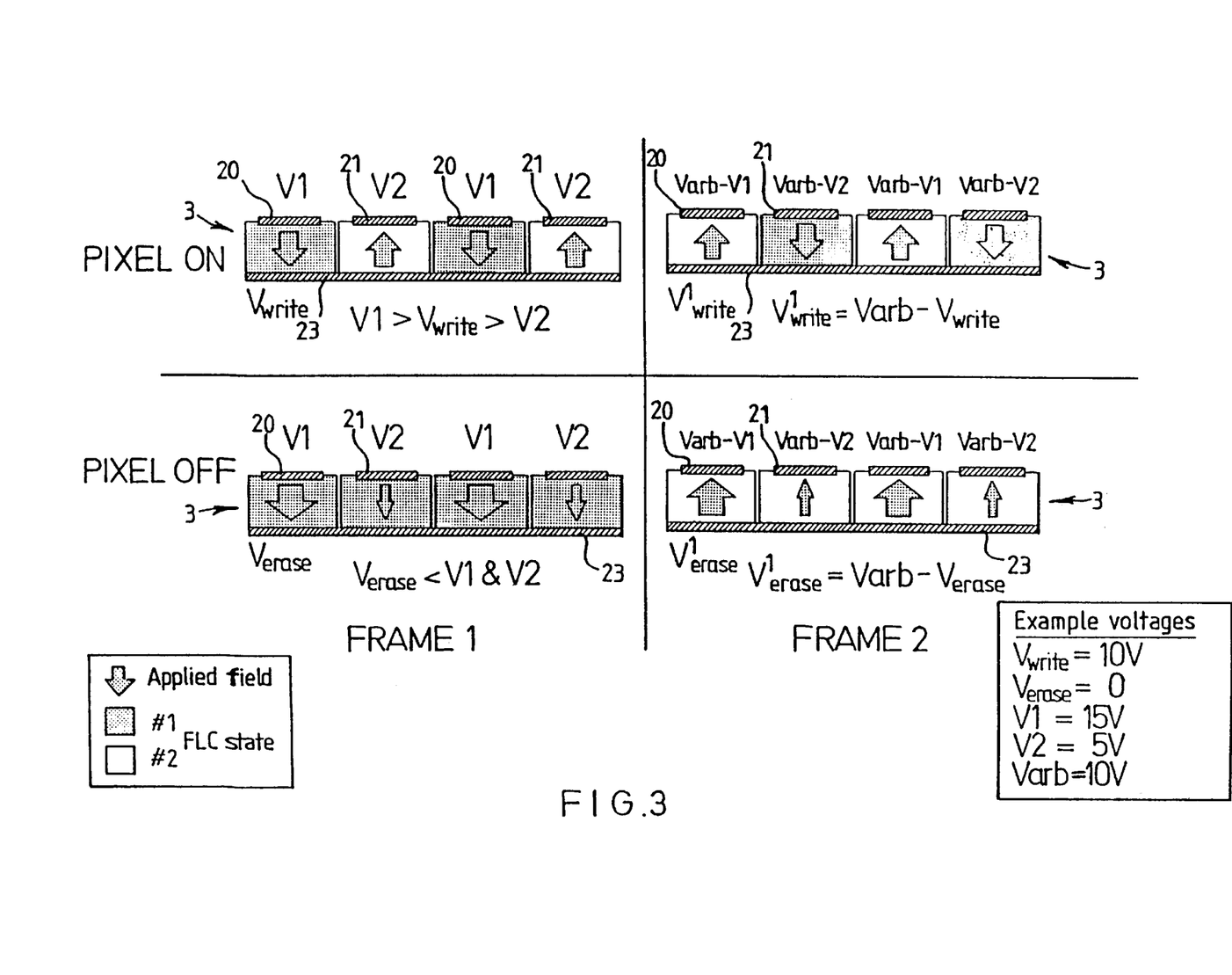
FIG. 3 is a diagram illustrating continuous voltage addressing of the SLM shown in FIG. 2.

The "continuous" technique is illustrated in FIG. 3 for the case where there are two sets of interdigitated elongate electrodes. The left part of FIG. 3 illustrates operation during a first frame (FRAME 1) whereas the right hand part of FIG. 3 illustrates operation during the succeeding frame (FRAME 2). The FLC states #1 and #2 are illustrated by shading and lack of shading and the shaded arrows point in the applied field direction and have a width corresponding to the magnitude of the field.

During FRAME 1, continuous voltages V1 and V2, for instance of 15 and 5 volts, respectively, are applied to the electrodes 20 and 21, respectively. In order to switch the pixel "on" i.e. to the diffractive state a voltage $V_{write}$ is applied to the pixel electrode 23 such that $V_{write}$ is between V1 and V2 and may, for example, be 10 volts. The strips of FLC between adjacent electrodes 20 and 21 are thus subjected to electric fields of opposite polarity and of sufficient magnitude for the FLC to be switched oppositely. The that, in this state, there is a relative phase shift, for instance of 180 degrees, between the adjacent strips of FLC so that the pixel acts as a phase-only diffraction grating.

In order for the pixel to be switched to the "off" or non-diffractive state, a voltage $V_{erase}$ is applied to the pixel electrode 23. $V_{erase}$ has a value which is either greater than or less than both the voltages V1 and V2. For instance, as shown in FIG. 3, $V_{erase}$ is below V1 and V2 and may, for example, be 0 volts. The strips of FLC between adjacent electrodes 20 and 21 are subject to an electric field in the same direction and of sufficient magnitude for all of the FLC of the pixel to be switched to the same state. Light passing through FLC strips under adjacent electrodes 20 and 21 is subject to the same phase shift so that the pixel does not diffract the light.

With the pixel switched off and, depending on the actual voltages chose, possibly with the pixel switched on, there may be electric field components which are perpendicular to the depth direction of the layer 3. However, many electro-optic materials such as FLC are substantially insensitive to such in-plane electric fields between the interdigitated electrodes 20 and 21 so that, for instance, good erasure of the grating in the pixel off-state can be achieved.

In order to avoid electro chemical degradation of electro-optic materials such as FLC, the net voltage across each strip of the layer 3 when averaged over time should be equal to zero. It is possible to provide such compensation by reversing all of the electrode voltages about an arbitrary voltage Varb during alternate frames. AC shown in FIG. 3, Varb. may be equal to ten volts. Thus, during FRAME 2, the voltages supplied to the electrodes 20 and 21 are (Varb-V1) and (Varb-V2), respectively. In order to turn the pixel on, a write voltage $V'_{write}$ equal to (Varb-$V_{write}$) is applied to the pixel electrode 23. To turn the pixel off, an erase voltage $V'_{erase}$ equal to (Varb-$V_{erase}$) is applied to the pixel electrode 23. The electric field directions are thus reversed for the on and off states of the pixel compared with FRAME 1. Because the Image data generally change with time, field balancing relies on statistical averaging over a period of time. Although perfect field balancing may not be achieved, achievable balancing will, in general, be sufficiently good to avoid electrochemical degradation of the FLC or other electro-optic material of the layer 3.

Figure 4:
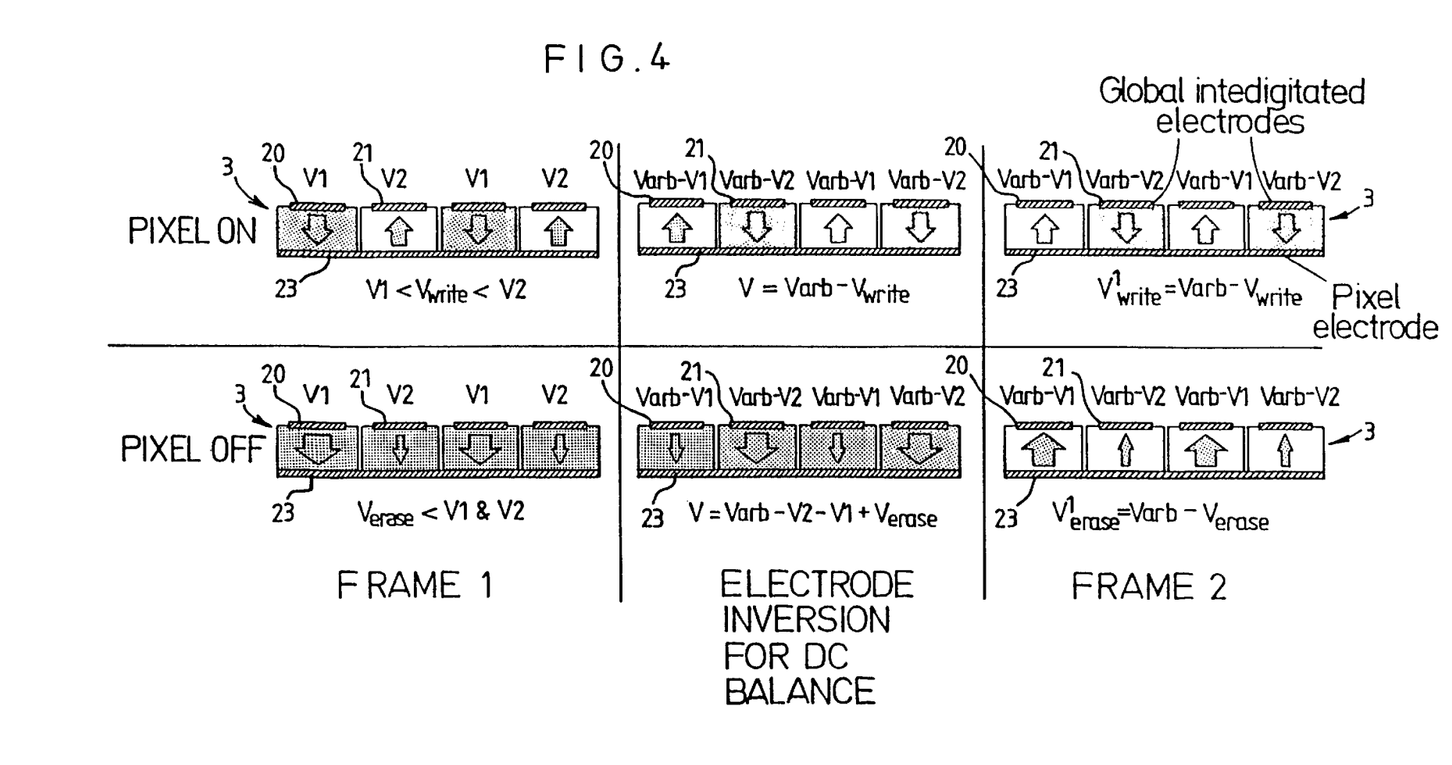
FIG. 4 is a diagram similar to FIG. 3 illustrating a technique for achieving DC balancing.

FIG. 4 illustrates the effect of inverting the voltages V1 and V2 using a dynamic random access memory (DRAM) addressing technique. This technique uses the active matrix addressing scheme such that image data are refreshed one row at a time. When a pixel is being refreshed, the pixel electrode 23 if connected to the appropriate voltage. However, between consecutive pixel refreshers, the pixel electrode 23 is disconnected so as to be electrically isolated from the addressing circuitry. The voltage on the pixel electrode 23 between refresher is thus determined by effects such as the voltages on the electrodes 20 and 21.

In FIG. 4, the voltages in FRAME 1 on the electrodes 20, 21 and 23 are the same as in FIG. 3. At the end of FRAME 1, in order to provide field balancing, the voltages V1 and V2 are inverted about the arbitrary voltage Varb. The voltage on the isolated pixel electrode 23 becomes Varb-$V_{write}$.

As shown in FIG. 4, this has the effect of reversing all of the field directions in the strips of FLC. Optically, this makes no difference because the grating remains and the pixel remains in the on-state.

For a pixel which was in the non-diffractive or off state, inversion of the voltages on the electrodes 20 and 21 causes the voltage on the isolated pixel electrode 23 to become:

Varb-V2-V1+$V_{erase}$

This voltage is such that all of the FLC strips remain in the same state. The pixel therefore remains non-diffractive or in the off state. Thus, inversion of the interdigitated electrodes 20 and 21 does not alter the optical states of the pixels.

Another technique based on electro-optic materials which respond primarily to field direction but not to magnitude once saturation is achieved is such that the pixels are not driven at all times. This technique relies on bistabilty of the electro-optic material such as FLC. In this case, the switch state is preserved when the "writing" field has been removed.

In order to perform this technique, two distinct switching cycles are required for each pixel. In the first cycle, all of the pixels are switched to the same state and, in the second cycle, those pixels which are required to be in the other state are switched. For instance, in the first cycle, the pixel electrodes 23 may be switched to zero volts and the electrodes 20 and 21 may be switched to relatively high positive and negative voltages, respectively. All pixels are thus turned on into the diffractive state. During the second cycle, the voltages on the electrodes 20 and 21 are set to zero volts and the pixel electrodes 23 of those pixels which are required to be non-diffractive are set to a voltage which erases the gratings in those pixels.

Figure 5:
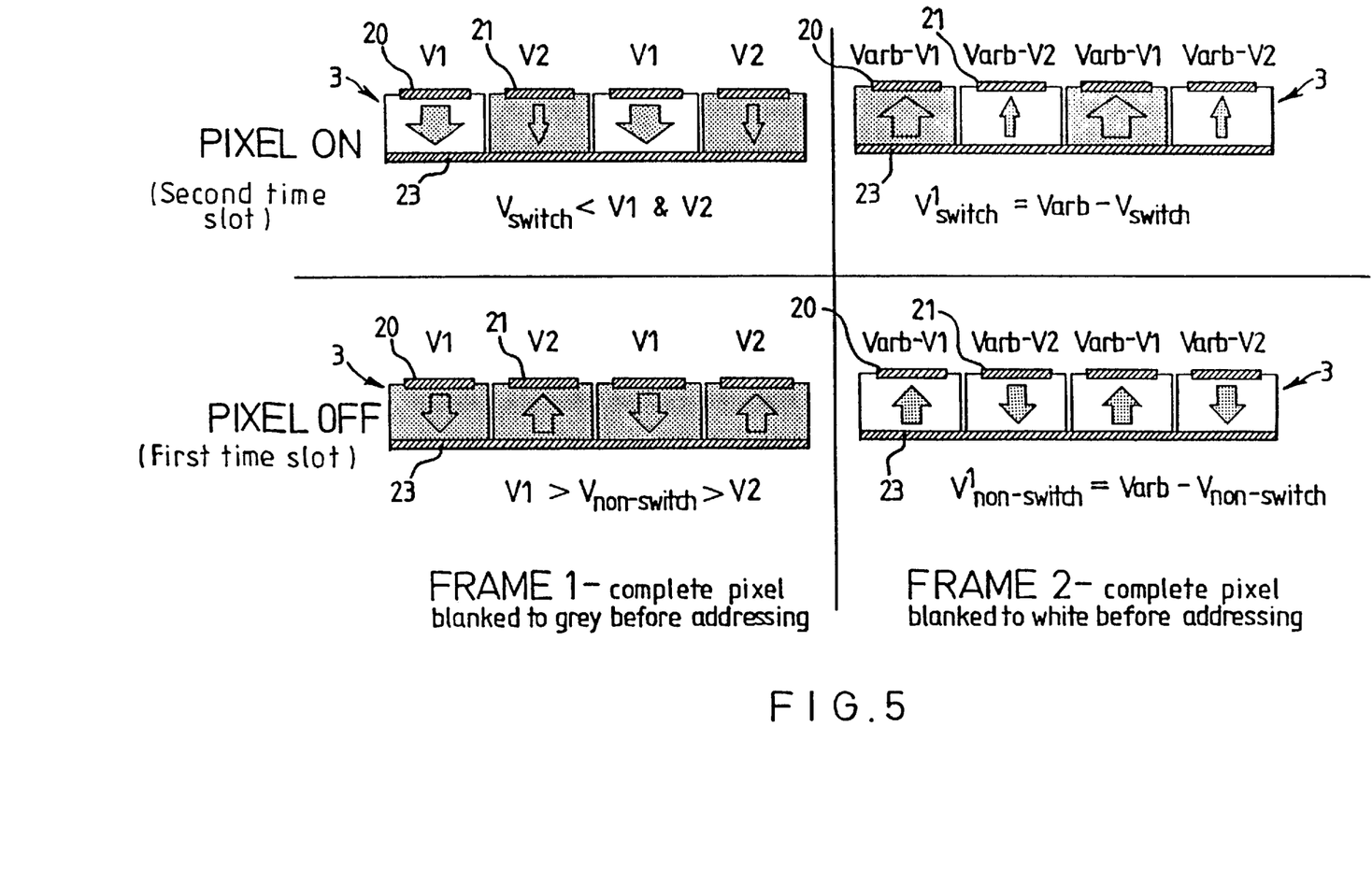
FIG. 5 is a diagram illustrating pulsed addressing of the SLM of FIG. 2.

FIG. 5 illustrates a pulsed addressing technique in which pulses are applied to the electrodes of magnitudes and for durations such that the electro-optic material such as FLC does not saturate. Again, the left and right sides of FIG. 5 illustrate consecutive frames to provide field balancing.

In FRAME 1, all of the pixels are initially switched or "blanked" to a non-diffractive state. Pulses having voltages of V1 and V2 are applied to the electrodes 20 and 21 for a predetermined duration. Simultaneously, a pulse having an amplitude of $V_{non-switch}$ between V1 and V2 is applied to the pixel electrode 23 for the same duration. The pulse durations and amplitudes are chosen so that all of the strips of FLC under the electrodes 20 and 21 are switched to state #1. The pixels are therefore all in the non-diffractive mode during a first time slot of the frame.

During a second time slot, the electrodes 20 and 21 receive pulses of the same duration and of amplitudes V1 and V2 as in the first time slot. However, in the second time slot, the electrode 23 receives a pulse whose amplitude $V_{switch}$ is less than V1 and V2. V1 is greater than V2 and $V_{switch}$ is selected so that the FLC strips under the electrodes 20 are switched to the second state #2 whereas the strips below the electrodes 21 remain in the #1. The pixel can thus be switched on to the diffractive state.

If the pixel is required to stay in the non-diffractive state, then the pixel electrode 23 is allowed to float during the second time slot so that because of the bistabilty of the FLC, the pixel remains in the state set during the first time slot.

During FRAME 2, all of the voltages are inverted about an arbitrary voltage Varb, which may be equal to zero, so as to provide field direction balancing, as described hereinbefore with reference to FIG. 3. Although such balancing may not occur on a frame to frame basis because of changes in the pixel data, such a technique provides adequate balancing to avoid electrochemical degradation of the material of the layer 3 over a sufficient period of operation.

This technique may be modified such that the writing voltage is not between the voltages on the interdigitated electrodes 20 and 21 during the time slots but is at a level such that the induced fields are sufficiently low not to switch the FLC within the pulse width. By altering the pixel voltage from the mean of the interdigitated electrode voltages, the field across the FLC under one set of electrodes may be made to exceed the threshold and switch the FLC while the remainder of the FLC is unaltered so as to form a grating.

Further, following the switching time slots, a high frequency alternating voltage may be supplied to the electrodes 20, 21 so as stabilize the FLC in the states selected at the pixels and/or so as to increase the effective switching angle of the FLC.

An SLM employing this technique may be embodied in the form of a buffered SRAM-type circuit with global timing capability. With such an arrangement, a one bit storage element is provided for each pixel and the storage elements are loaded by conventional line-by-line addressing. When a complete frame of data has been written, a latch is switched so as to supply the appropriate voltage to the pixel electrodes 23. Simultaneously, the interdigitated electrodes 20 and 21 are connected to receive the appropriate voltages. For instance, one set of electrodes may be set at twice the supply voltage of the SRAM-type circuit and the other set of electrodes may be set to zero volts. After a predetermined time slot, all voltages are reduced to zero for the remainder of the frame or the set of electrodes may be connected together and to an alternating voltage source for stabilisation purposes. Also, during this period, the pixel storage elements are updated with the next frame of data for the SLM.

Such a SRAM-type arrangement may alternatively be operated in the following way. While the pixels are displaying a preceding frame of data, the pixel electrodes 23 are connected to ground and the electrodes 20 and 21 are connected together and to one terminal of an AC source whose terminal is grounded. The AC source supplies a high frequency signal, for instance of the order of 10 kHz, of insufficient magnitude to change the pixel state but sufficient to stabilise the FLC and/or to increase the effective switching angle of the FLC. During this period, a new frame of display data is written into the addressing circuit Before the new frame of data is displayed, all of the pixels are "blanked" to the same state corresponding to a black display state when viewed. For blanking purposes, all of the pixel electrodes 23 remain connected to ground but the electrodes 20 and 21 are connected together and to a DC source which supplies a signal of sufficient magnitude and duration to ensure that all gratings are erased so that all of the pixels are in the non-diffractive state. This may be achieved, for instance, by "stopping" the AC source at a suitable point in its waveform and for a sufficient period for all of the FLC strips to be switched to the same state.

A "global strobe signal" then causes voltage pulses to be applied simultaneously to the pixel electrodes 23 and the electrodes 20 and 21. Pulses of different magnitudes V1 and V2 are applied to the electrodes 20 and 21, respectively. In order for a pixel to remain in tho non-diffractive state, a pulse whose amplitude is between V1 and V2 is simultaneously applied to the pixel electrode. The resulting fields which are generated are too small to cause the FLC to respond so that the pixel remains in the non-diffractive state. Alternatively, if the pixel is to be switched to the diffractive state, the pixel electrode 23 remains grounded. The amplitudes V1 and V2 are chosen such that the FLC strips subjected to the smaller field do not respond but the FLC strips subjected to the high field are switched. The pixel is thus switched to the diffractive state.

The AC source is again connected between the pixel electrodes 23 and the interdigitated electrodes 20 and 21 while another frame of display data is loaded. Field direction balancing may then be performed, for instance as described hereinbefore.

Figure 6:
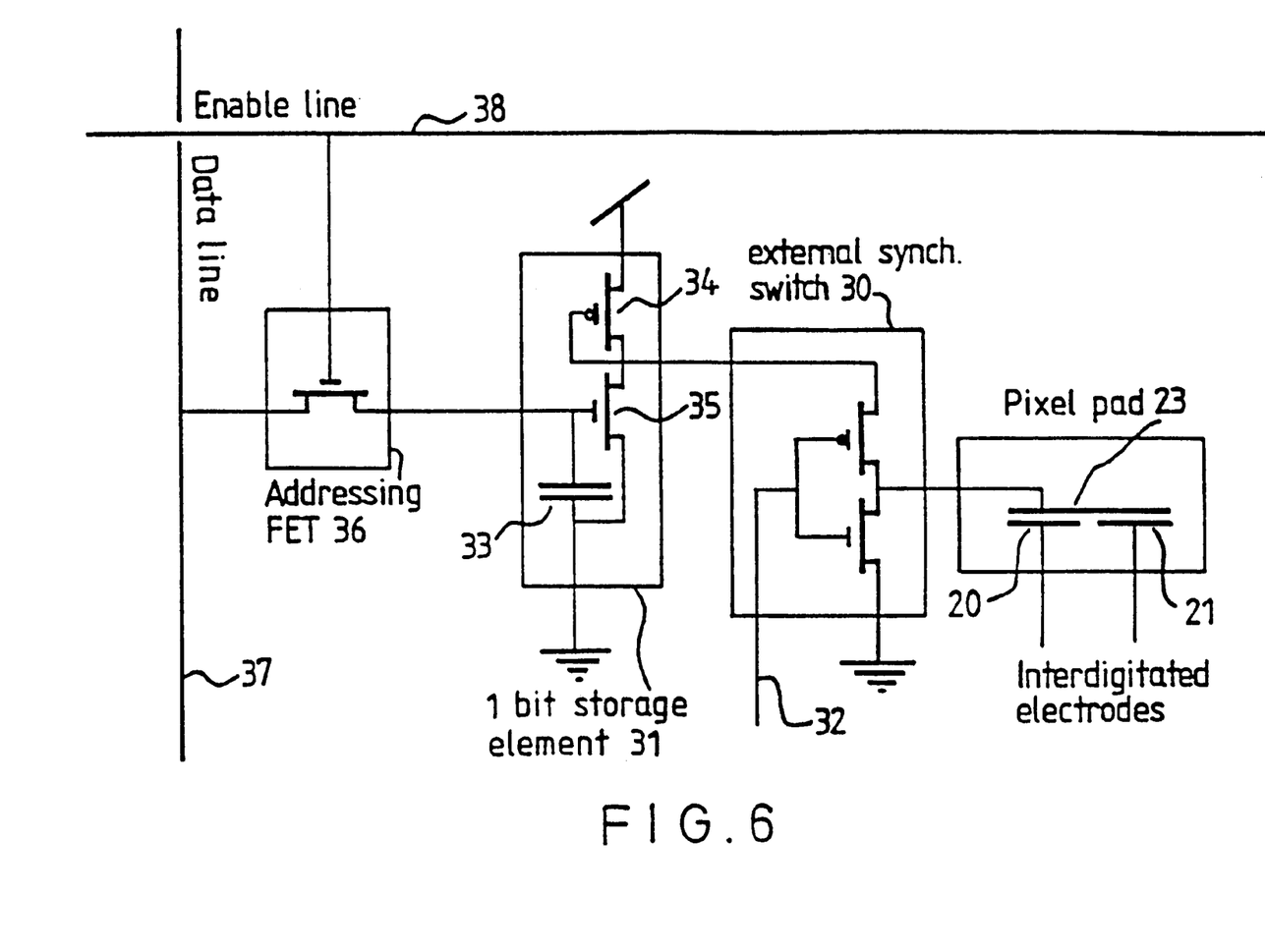
FIG. 6 is a circuit diagram of a pixel circuit based on static random access memory (SRAM) techniques suitable for implementing the pulsed addressing illustrated in FIG. 5.

FIG. 6 illustrates a pixel circuit for a SRAM-type addressing circuit. The circuit may be formed, for instance, by standard LSI or VLSI on a silicon substrate comprising the bottom substrate 2. The pixel electrode or pad 23 is connected to the output of an external synchronising switch 30. The switch 30 has an input connected to a one bit storage element 31 and a control input 32 connected to the control inputs of all the other pixels. The switch 30 connects the pixel pad 23 to ground or to the output of the element 31, depending on the signal on the control input.

The storage element 31 comprises a capacitor 33 and a buffer formed by transistors 34 and 35. The input of the element 31 is connected via the source/drain path of an addressing field effect transistor (FET) 36 to a drain line 61. The line 37 is connected to the drains of the transistor 36 of a column of SLM pixels and supplies data for writing to the pixels one row at a time. The gate of the transistor 36 is connected to an enable line 38 which is connected to the gates of the transistors 36 of a row of pixels. Image data are supplied a row at a time to the lines 37 and a strobe pulse is supplied in a repeating sequence to the lines 38 to enter the current row data into the selected or enabled row of pixel storage elements 31. When all of the rows have been refreshed, all of the switches 30 of the SLM are switched so that the pixels display the new frame of image data. The pixel electrodes are then connected to ground for the remainder of the frame while a fresh frame of image data is entered in the SLM.

As an alternative to the blanking arrangements illustrated in FIG. 5, the sets of electrodes 20 and 21 may be connected together in a first time slot and to a sufficiently high voltage for erasing or blanking any pixel gratings to a known uniform state.

Figure 7:
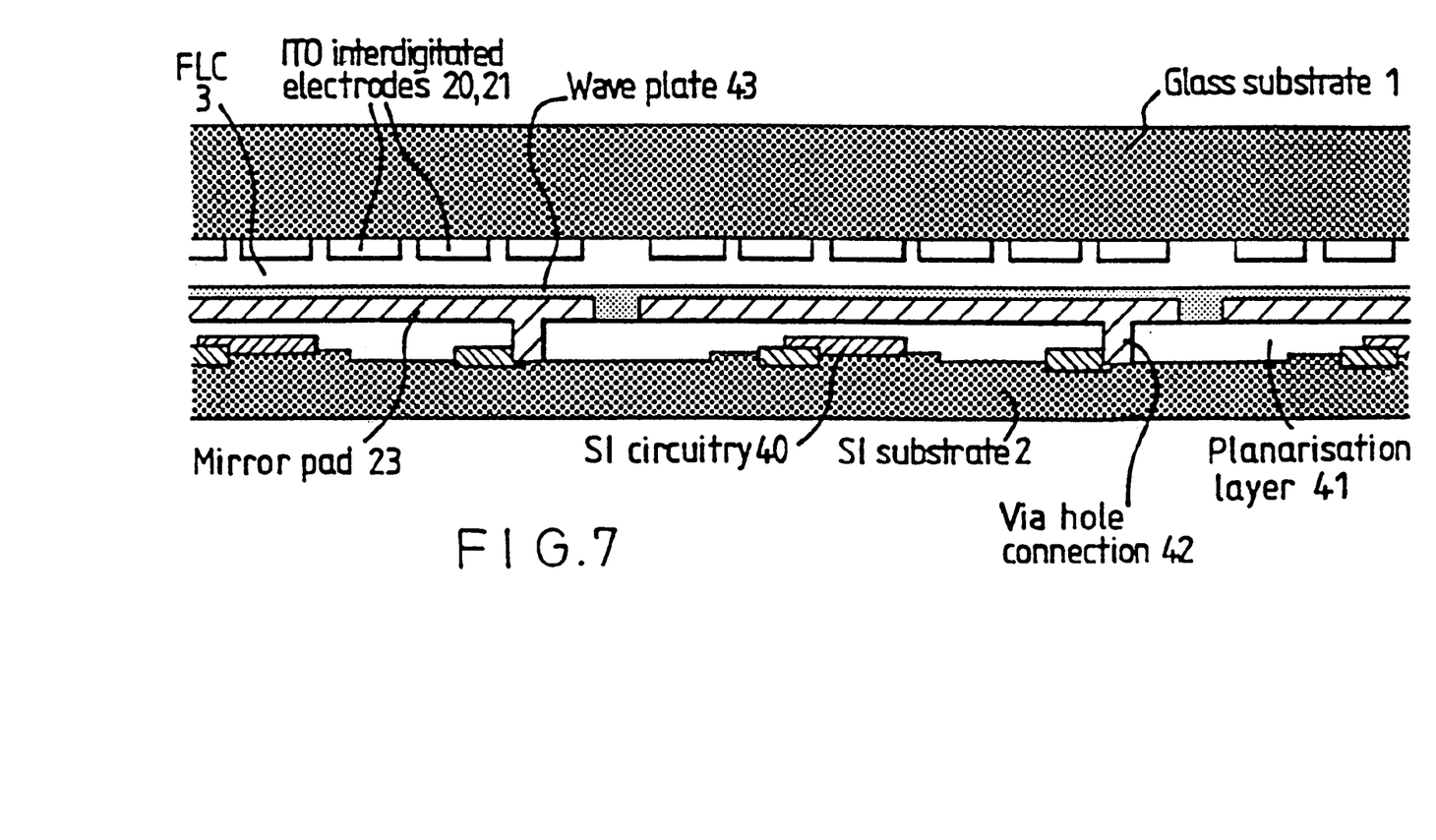
FIG. 7 is a cross-sectional view of an SLM of the type shown in FIG. 2.

FIG. 7 illustrates the structure of a reflective mode SLM in which the top substrate 1 is made of glass and carries the interdigitated electrodes 20 and 21 which are transparent and made of ITO. The bottom substrate 2 is made of silicon (Si) in which the addressing circuitry 40 is integrated, for instance using standard VLSI techniques. A planarisation layer 41 is formed on top of the substrate 2 with "via hole" connections 42 connecting the pixel electrodes 23, which form mirror pads, to the circuitry 40. An optional waveplate 43 is shown between the pads 23 and the layer of FLC 3. Aligning layers (not shown) are provided for suitably aligning the FLC.

DRAM-type and SRAM-type addressing circuits may also be provided in alternative "active back plane" technologies, such as polysilicon or amorphous silicon on glass.

What is claimed is:

1. A diffractive spatial light modulator, comprising:
    a layer of electro-optic material;
    a first electrode arrangement substantially covering a first side of the layer; and
    a second electrode arrangement substantially covering a second side of the layer,
        wherein the first electrode arrangement includes a plurality of sets of elongate electrodes, the elongate electrodes of each of the sets being electrically connected together and being interdigitated with the elongate electrodes of at least one of the other sets, and the second electrode arrangement includes a plurality of discrete picture element electrodes.

2. A diffractive spatial light modulator according to claim 1, wherein the electro-optic material includes a liquid crystal.

3. A diffractive spatial light modulator according to claim 2, wherein the liquid crystal is a ferroelectric liquid crystal.

4. A diffractive spatial light modulator according to claim 1, wherein the elongate electrodes are transparent.

5. A diffractive spatial light modulator according to claim 1, wherein the elongate electrodes are reflective.

6. A diffractive spatial light modulator according to claim 1, wherein the picture element electrodes are arranged as a two dimensional array.

7. A diffractive spatial light modulator according to claim 1, wherein the picture element electrodes are disposed on a substrate carrying addressing electronics.

8. A diffractive spatial light modulator according to claim 7, wherein the addressing electronics includes active matrix type addressing electronics.

9. A diffractive spatial light modulator according to claim 8, wherein the active matrix type addressing electronics includes a plurality of type addressing including a storage element, and each of the picture element electrodes is connected to one of the control circuits.

10. A diffractive spatial light modulator according to claim 9, wherein each of the storage elements includes a capacitor connected to an input of a buffer.

11. A diffractive spatial light modulator according to claim 9, wherein each of the storage elements is connected to the associated picture element electrode by a gate having a control input, and the control inputs of the gates for the respective picture element electrodes are connected together.

12. A diffractive spatial light modulator according to claim 1, wherein the respective sets of the elongate electrodes are arranged to receive continuously-applied voltages, and each of the picture element electrodes is selectively arranged to receive a first voltage for selecting a non-diffractive picture element state and at least one second voltage for selecting a diffractive picture element state, the first voltage being greater than or less than all of the continuously-applied voltages, and the at least one second voltage being between the highest and the lowest of the continuously-applied voltage.

13. A diffractive spatial light modulator according to claim 12, wherein the first voltage, the at least one second voltage, and the continuously-applied voltages are inverted with respect to a predetermined voltage for alternate frames of supplied data.

14. A diffractive spatial light modulator according to claim 13, wherein the predetermined voltage is zero.

15. A diffractive spatial light modulator according to claim 1, wherein the respective sets of the elongate electrodes and the respective picture element electrodes are arranged to simultaneously receive first pulses and second pulses, respectively, each of the second pulses having an amplitude less than amplitudes of the first pulses for switching to a diffractive picture element state or an amplitude between the highest and the lowest of the amplitudes of the first pulses for switching to a non-diffractive picture element state.

16. A diffractive special light modulator according to claim 15, wherein the respective sets of the elongate electrodes and the respective picture element electrodes are arranged to receive therebetween an alternating voltage which is present between the consecutive first and second pulses.

* * * * *